(12) United States Patent
Hoerz et al.

(10) Patent No.: US 11,581,771 B2
(45) Date of Patent: Feb. 14, 2023

(54) ELECTRICAL MACHINE

(71) Applicant: Mahle International GmbH, Stuttgart (DE)

(72) Inventors: Mirko Hoerz, Esslingen (DE);
Hans-Ulrich Steurer, Stuttgart (DE);
Josef Sonntag, Nuertingen (DE);
Markic Stojan, Kojsko (SI); Andrej Licen, Branik (SI); Aleks Medvescek, Rence (SI); Peter Sever, Murska Sobota (SI); Philip Grabherr, Stuttgart (DE)

(73) Assignee: Mahle International GmbH

( * ) Notice: Subject to any disclaimer, the term of this patent is extended or adjusted under 35 U.S.C. 154(b) by 456 days.

(21) Appl. No.: 16/614,678

(22) PCT Filed: May 18, 2018

(86) PCT No.: PCT/EP2018/063165
§ 371 (c)(1),
(2) Date: Nov. 18, 2019

(87) PCT Pub. No.: WO2018/211096
PCT Pub. Date: Nov. 22, 2018

(65) Prior Publication Data
US 2020/0185993 A1 Jun. 11, 2020

(30) Foreign Application Priority Data
May 19, 2017 (DE) .................... 102017208546.0

(51) Int. Cl.
*H02K 3/24* (2006.01)
*B60K 1/00* (2006.01)
*H02K 9/22* (2006.01)

(52) U.S. Cl.
CPC ............... *H02K 3/24* (2013.01); *B60K 1/00* (2013.01); *H02K 9/227* (2021.01)

(58) Field of Classification Search
CPC ............ H02K 1/20; H02K 3/24; H02K 9/00
See application file for complete search history.

(56) References Cited

U.S. PATENT DOCUMENTS 2,390,130 A 12/1945 Sigmund et al.
3,960,803 A 6/1976 Smith et al.
(Continued)

FOREIGN PATENT DOCUMENTS

CH 711202 A2 12/2016
CN 105308832 A 2/2016
(Continued)

OTHER PUBLICATIONS

Japanese Advisory Action dated Mar. 4, 2022 related to corresponding Japanese Patent Application No. 2019-563867.
(Continued)

*Primary Examiner* — Ramon M Barrera
(74) *Attorney, Agent, or Firm* — Fishman Stewart PLLC (57) ABSTRACT

An electrical machine may include a comprise a rotor, a stator, a coolant distributor chamber and a coolant collector chamber. The rotor may be rotated about an axis of rotation that defines an axial direction of the electrical machine. The stator may comprise a plurality of stator windings. The coolant collector chamber may be axially arranged at a distance from the coolant distributor chamber. The coolant distributor chamber may communicate fluidically with the coolant collector chamber by way of least one cooling channel through which a coolant can flow. The at least one cooling channel and the at least one stator winding may be embedded in a plastic mass consisting of an electrically insulating plastic for thermal coupling to the coolant.

26 Claims, 4 Drawing Sheets

(56) References Cited

U.S. PATENT DOCUMENTS

| | | | |
|---|---|---|---|
| 5,214,325 | A | 5/1993 | Matson et al. |
| 6,975,051 | B2 | 12/2005 | Groening et al. |
| 9,847,702 | B2 | 12/2017 | Lambert et al. |
| 2008/0042498 | A1 | 2/2008 | Beer |
| 2010/0090557 | A1 | 4/2010 | El-Refaie et al. |
| 2014/0091651 | A1 | 4/2014 | Dorfstatter et al. |
| 2014/0300220 | A1 | 10/2014 | Marvin |

FOREIGN PATENT DOCUMENTS

| | | |
|---|---|---|
| DE | 102012217711 A1 | 4/2014 |
| DE | 102012221325 A1 | 5/2014 |
| DE | 102013223059 A1 | 5/2015 |
| DE | 102014215916 A1 | 2/2016 |
| EP | 1841043 A1 | 3/2007 |
| JP | S52123609 U | 9/1977 |
| JP | S57090365 U | 6/1982 |
| JP | 2003070199 A | 3/2003 |
| JP | 2004522395 A | 7/2004 |
| JP | 2004297924 A | 10/2004 |
| JP | 2010-252491 A | 11/2010 |
| WO | WO-2005/004309 A1 | 1/2005 |
| WO | WO-2017070034 A1 | 4/2017 |

OTHER PUBLICATIONS

Chinese Office Action dated Sep. 10, 2021 related to corresponding Chinese Patent Application No. 201880042817.1.
Japanese Office Action dated Dec. 8, 2020 related to Japanese Patent Application No. 2019-563867.
Chinese Office Action dated Feb. 20, 2021 related to corresponding Chinese Patent Application No. 201880042817.1.
English abstract for DE-102012221325.
English abstract for DE-102014215916.
English abstract for EP-1841043.

ELECTRICAL MACHINE

CROSS-REFERENCE TO RELATED APPLICATIONS

This application claim priority to International Patent Application No. PCT/EP2018/063165 filed May 18, 2018, which also claims priority to German Patent Application DE 10 2017 208 546.0 filed May 19, 2017, each of which is hereby incorporated by reference in its entirety.

TECHNICAL FIELD

The invention relates to an electrical machine, particularly for a vehicle, and to a vehicle with such a machine.

An electrical machine of this type can in general be an electric motor or a generator. The electrical machine can be in the form of an external rotor or an internal rotor.

BACKGROUND

A machine of the type in question is known, for example, from U.S. Pat. No. 5,214,325. It comprises a housing which surrounds an interior space and which has a casing encircling in a circumferential direction of the housing and radially bounding the interior space, a rear side wall axially bounding the interior space axially on one side and a front side wall axially bounding the interior space axially on the other side. A stator of the machine is fixedly connected to the casing. A rotor of the machine is arranged in the stator, with a rotor shaft of the rotor being mounted rotatably on the front side wall via a front shaft bearing.

The stator of a conventional electrical machine typically comprises stator windings which are electrically energized during the operation of the machine. In the process, heat arises which has to be dissipated in order to avoid overheating and associated damage or even destruction of the stator. For this purpose, it is known from conventional electrical machines to equip said machines with a cooling device for cooling the stator—in particular said stator windings. Such a cooling device comprises one or more cooling channels through which a coolant flows and which are arranged in the vicinity of the stator windings in the stator. Heat can be dissipated from the stator by transmission of heat from the stator windings to the coolant.

It has proven disadvantageous here that efficient transfer of heat from the stator to the coolant flowing through the respective cooling channel is associated only with a considerable structural outlay. However, this has a disadvantageous effect on the production costs of the electrical machine.

It is therefore an object of the present invention to provide an improved embodiment for an electrical machine, in which said disadvantage is substantially or even completely eliminated. In particular, the intention is to provide an improved embodiment for an electrical machine that is distinguished by improved cooling of the stator windings of the stator.

SUMMARY

This object is achieved by the subject matter of the independent patent claims. Preferred embodiments are the subject matter of the dependent patent claims.

Accordingly, the basic concept of the invention is to embed the stator windings of an electrical machine together with a cooling channel through which a coolant flows and which is provided for cooling the stator windings into a plastics compound consisting of an electrically insulating plastic. The plastic can therefore act firstly as a heat-transmitting medium for transmitting heat from the stator windings to the coolant and secondly as an electrical insulator for the stator windings. In particular, particularly good transfer of heat between the stator windings and the coolant guided through the cooling channel is thereby produced. This is true in particular if use is made of a plastic which has high thermal conductivity. Particularly what are referred to as thermosetting plastics are suitable for this purpose. Use of an electrically insulating plastic simultaneously ensures that the stator windings to be cooled are not undesirably electrically short-circuited by the plastic.

The direct thermal coupling of the cooling channel with the coolant to the stator windings to be cooled, with the aid of the embedding essential to the invention of said two components in a plastics compound leads to particularly effective cooling of the stator windings in comparison to conventional cooling devices. Even when a high level of waste heat is produced in the stator, as occurs, for example, in a high-load mode of the electrical machine, it can therefore be ensured that the waste heat which arises can be dissipated from the stator. Damage or even destruction of the electrical machine due to overheating of the stator can therefore be avoided. The plastics compound essential to the invention can preferably be produced by means of injection molding with the stator windings to be cooled and the cooling channel being insert molded with the plastic in order to form the plastics compound. The embedding of the stator windings and of the cooling channel in the plastics compound therefore turns out to be very simple. Considerable cost advantages thereby arise in the production of the electrical machine according to the invention.

An electrical machine according to the invention, in particular for a vehicle, comprises a rotor which is rotatable about an axis of rotation. The axis of rotation defines an axial direction of the electrical machine. In addition, the machine comprises a stator which has a plurality of stator windings. The machine furthermore comprises a coolant distributor chamber and a coolant collector chamber arranged axially at a distance from the latter. The coolant distributor chamber fluidically communicates here with the coolant collector chamber by means of at least one cooling channel through which a coolant can flow. A plurality of such cooling channels are preferably provided between the coolant distributor chamber and the coolant collector chamber. According to the invention, for the thermal coupling to the coolant, the at least one cooling channel and the at least one stator winding are embedded at least in sections in a plastics compound consisting of an electrically insulating plastic.

According to a preferred embodiment, for the thermal coupling to the stator windings, the coolant distributor chamber and/or the coolant collector chamber are at least partially arranged in the at least one plastics compound. This permits a particularly good transfer of heat between the coolant distributor chamber or coolant collector chamber and the stator windings, and therefore the coolant distributor chamber or the coolant collector chamber can also be used for directly absorbing heat from the stator windings.

According to another preferred embodiment, the stator has stator teeth which extend along the axial direction, are arranged at a distance from one another along a circumferential direction and carry the stator windings. In this embodiment, the plastics compound is arranged with the at least one cooling channel and with the at least one stator winding in an intermediate space which is formed between two adjacent stator teeth in the circumferential direction. This measure ensures particularly good transfer of heat between the stator windings and the cooling channel since the cooling channel is arranged in the intermediate space in the immediate vicinity of the stator windings to be cooled. Furthermore, during the production of the plastics compound, said intermediate space between the stator teeth can be used in the manner of a casting mold into which the plastic of the plastics compound is injected. This simplifies the production of the plastics compound since the provision of a separate casting mold can be omitted.

A further preferred refinement proposes dividing the intermediate space into a first and a second partial space. In this refinement, the at least one stator winding is arranged in the first partial space. The at least one cooling channel is arranged in the second partial space. A positioning aid is formed between the two partial spaces, by means of which positioning aid the at least one cooling channel can be positioned in the second partial space. This measure permits precise and stable positioning of the cooling channel—which is typically a tubular body or a flat tube—if said cooling channel is insert molded together with the stator windings in the intermediate space between the two stator teeth with the plastic producing the plastics compound.

In an advantageous development of this refinement, the positioning aid comprises two projections which are formed on two adjacent stator teeth in the circumferential direction. The two projections face each other in the circumferential direction of the rotor and project into the intermediate space in order to position the cooling channel. This refinement permits a particularly precise alignment of the cooling channel in the intermediate space prior to the insert molding with the plastic of the plastics compound.

The plastics compound expediently projects axially, preferably on both sides, out of the respective intermediate space. The plastics compound can therefore also be used for partially bounding the coolant distributor chamber or the coolant collector chamber. In particular, the required removal during the production of the machine of that part of the plastics compound which projects from the intermediate space can be omitted, which is associated with cost advantages during the production of the machine.

A further advantageous refinement therefore proposes that the at least one plastics compound at least partially bounds the coolant distributor chamber and/or the coolant collector chamber. The provision of a separate boundary for the coolant distributor chamber or the coolant collector chamber, for example in the form of a housing, can therefore be omitted.

According to a preferred embodiment, a plastics compound arranged in the intermediate space is composed of a single plastics material. In this embodiment, additional electrical insulation consisting of an electrically insulating material is arranged in the intermediate space, preferably between the stator winding or plastics compound and the stator tooth. Since, in this embodiment, only a single plastics material has to be introduced in the intermediate spaces, the production of the plastics compound from said plastic can take place in a single injection molding step. The production of the plastics compound therefore turns out to be particularly simple, which is associated with cost advantages.

The plastics compound expediently substantially completely fills the intermediate space. The formation of undesirable intermediate spaces, for example in the manner of air gaps, which would lead to an undesirable reduction in the transfer of heat, is thereby avoided.

The electrically insulating plastic of the plastics compound expediently comprises a thermosetting plastic or is a thermosetting plastic. Alternatively, the electrically insulating plastic of the plastics compound can comprise a thermoplastic or can be a thermoplastic. In a further variant, a combination of a thermosetting plastic and a thermoplastic is also conceivable.

Expediently, in each case at least one cooling channel and the plastics compound can be provided in at least one, preferably in each, intermediate space between two respectively adjacent stator teeth in the circumferential direction. This ensures that operationally generated waste heat can be dissipated from all of the stator windings present.

According to another preferred embodiment, the at least one cooling channel is arranged radially outside and/or radially within the respective stator winding in the intermediate space. This permits a space-saving arrangement of the cooling channel close to the stator windings to be cooled, and therefore the electrical machine requires only little construction space for the cooling of the stator windings.

A preferred refinement proposes designing the at least one cooling channel as a tubular body which surrounds a tubular body interior space. In this variant, at least one separating element which divides the tubular body interior space into at least two partial cooling channels separated fluidically from one another is formed on the tubular body. The tubular body can be stiffened by means of said separating elements, and therefore the mechanical strength of the tubular body is increased.

An advantageous development proposes designing the tubular body as a flat tube which extends along the axial direction and, in a cross section perpendicular to the axial direction, has two wide sides and two narrow sides. Expediently, in the cross section perpendicular to the axial direction, at least one wide side of the flat tube extends substantially perpendicularly to the radial direction. A length of the two wide sides can preferably be at least four times, preferably at least ten times, a length of the two narrow sides.

According to a further preferred embodiment, the coolant distributor chamber and/or the coolant collector chamber are/is formed by a cavity present at least partially, preferably completely, in the plastics compound. The provision of a separate covering or of a housing for bounding the coolant distributor chamber or coolant collector chamber can therefore be omitted. Not inconsiderable cost advantages are associated therewith.

The plastics compound is particularly preferably an injection molding compound consisting of an electrically insulating plastic. The use of an injection molding process simplifies and accelerates the production of the plastics compound. This leads to cost advantages in the production of the electrical machine.

In an advantageous development, the stator comprises a, preferably annular, stator body from which the stator teeth protrude. In this development, the plastics compound consisting of the electrically insulating plastic is arranged on an outer circumferential side of the stator body and preferably forms a plastics coating on said outer circumferential side. The stator can therefore be electrically insulated from the surroundings. The provision of a separate housing for receiving the stator body can therefore be omitted. In an optional variant, coating of at least one or both end sides of the stator body with the plastics compound is also conceivable. In a further variant, the plastics compound can encase the stator body, preferably completely.

According to a preferred embodiment, the plastics compound at least partially surrounds at least one winding portion of at least one stator winding, said winding portion projecting axially out of the intermediate space of the stator body, and partially bounds the coolant distributor chamber and/or the coolant collector chamber in the process such that said winding portion of the stator winding is electrically insulated in relation to the coolant. An undesirable electrical short circuit of the coolant with the stator winding during the operation of the electrical machine is thereby prevented.

According to an advantageous development, the coolant distributor chamber fluidically communicates with the coolant collector chamber by means of a plurality of cooling channels.

The plurality of cooling channels expediently extends, in each case at a distance from one another, along the axial direction. This measure ensures that all of the axial portions of the stator windings are cooled.

The cooling channels are preferably arranged at a distance from one another along a circumferential direction of the stator. This measure ensures that all of the stator windings are cooled along the circumferential direction.

According to another preferred embodiment, the coolant distributor chamber and/or the coolant collector chamber are/is arranged adjacent to the stator body exclusively in an axial extension thereof. Preferably, in this embodiment, the coolant distributor chamber or the coolant collector chamber does not project beyond the stator body or stator in a radial direction thereof. This embodiment requires only very little construction space in the radial direction.

Particularly preferably, at least one stator winding is designed in such a manner that it is insulated electrically from the coolant and from the stator body at least in the region within the respective intermediate space during operation of the electrical machine. This is particularly preferably true of all of the stator windings of the electrical machine. An undesirable electrical short circuit of the stator winding with the stator body—during the operation of the electrical machine—with the coolant is thereby prevented.

Particularly expediently, said electrical insulation of the at least one stator winding from the stator body, preferably also from the stator teeth bounding the intermediate space, is formed completely by the plastics compound and/or by the additional electrical insulation already mentioned above. The provision of a further electrical insulator can thereby be omitted.

According to another preferred embodiment, the additional electrical insulation within the intermediate space extends over the entire length of the intermediate space, as measured along the axial direction, such that said insulation insulates the stator winding from the stator body and from the stator teeth bounding the respective intermediate space.

According to an advantageous development, the additional electrical insulation surrounds the stator winding within the intermediate space over at least the entire length of the intermediate space along the circumference thereof.

In a particularly preferred embodiment, the at least one stator winding is also electrically insulated from the cooling channel, which is in the form of a tubular body. The electrical insulation is formed here by the plastics compound and/or the additional insulation.

The stator windings can particularly preferably be part of a distributed winding.

The invention furthermore relates to a vehicle, in particular a motor vehicle, comprising an electrical machine presented above. The above-explained advantages of the electrical machine therefore also apply to the vehicle according to the invention.

Further important features and advantages of the invention emerge from the dependent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and will be explained in more detail in the description below.

DETAILED DESCRIPTION

Figure 1:
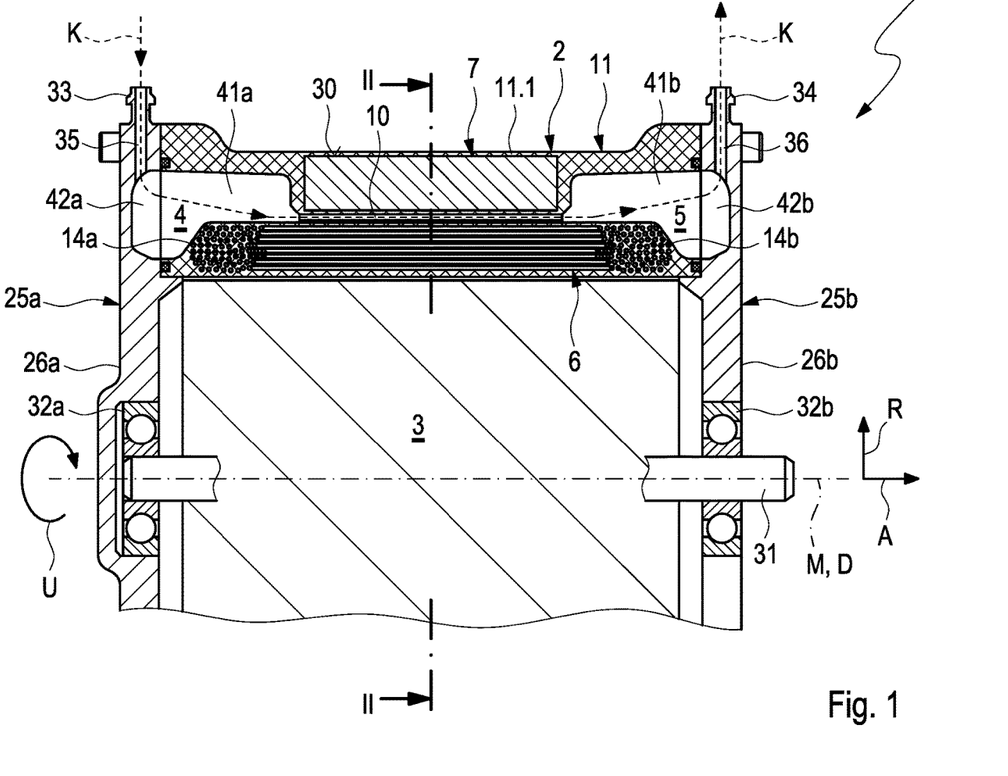
FIG. 1 shows an example of an electrical machine according to the invention in a longitudinal section along the axis of rotation of the rotor.

FIG. 1 illustrates an example of an electrical machine 1 according to the invention in a sectional illustration. The electrical machine 1 is dimensioned in such a manner that it can be used in a vehicle, preferably in a road vehicle.

Figure 2:
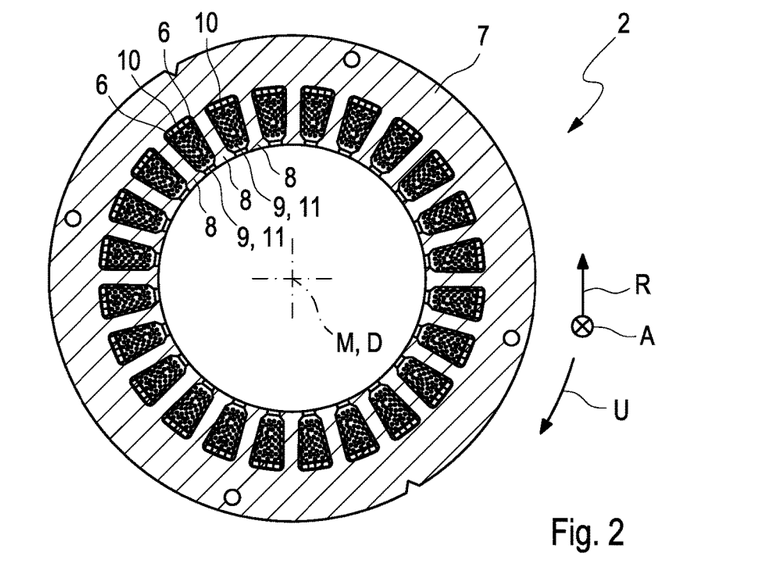
FIG. 2 shows the stator of the electrical machine according to FIG. 1 in a cross section perpendicular to the axis of rotation of the rotor.

The electrical machine 1 comprises a rotor 3, illustrated only roughly schematically in FIG. 1, and a stator 2. For clarification, the stator 2 in FIG. 2 is illustrated in a separate illustration in a cross section perpendicular to the axis of rotation D along the intersecting line II-II from FIG. 1. According to FIG. 1, the rotor 3 has a rotor shaft 31 and can have a plurality of magnets, not illustrated specifically in FIG. 1, the magnetic polarization of which changes along the circumferential direction U. The rotor 3 is rotatable about an axis of rotation D, the position of which is defined by the center longitudinal axis M of the rotor shaft 31. The axis of rotation D defines an axial direction A which extends parallel to the axis of rotation D. A radial direction R is perpendicular to the axial direction A. A circumferential direction U rotates about the axis of rotation D.

As FIG. 1 reveals, the rotor 3 is arranged in the stator 2. The electrical machine 1 shown here is therefore what is referred to as an internal rotor. However, a realization in the form of what is referred to as an external rotor, in which the rotor 3 is arranged outside the stator 2, is also conceivable.

The rotor shaft 31 is mounted on the stator 2 rotatably about the axis of rotation D in a first shaft bearing 32a and, spaced apart axially therefrom, in a second shaft bearing 32b.

In addition, the stator 2 comprises in a known manner a plurality of stator windings 6 which can be electrically energized in order to generate a magnetic field. The rotor 3 is set into rotation by magnetic interaction of the magnetic field generated by the magnets of the rotor 3 with the magnetic field generated by the stator windings 6. The stator windings 6 can be part of a distributed winding.

It is gathered from the cross section of FIG. 2 that the stator 2 can have an annular stator body 7, for example made of iron. In particular, the stator body 7 can be formed from a plurality of stator body plates (not shown) which are stacked one on another along the axial direction A and are adhesively bonded to one another. A plurality of stator teeth 8 are integrally formed radially on the inside of the stator body 7, the stator teeth extending along the axial direction A, protruding away radially inward from the stator body 7 and being spaced apart from one another along the circumferential direction U. Each stator tooth 8 carries a stator winding 6. The individual stator windings 6 together form a winding arrangement. Depending on the number of magnetic poles to be formed by the stator windings 6, the individual stator windings 6 of the entire winding arrangement can be electrically wired to one another in a suitable manner.

During the operation of the machine 1, the electrically energized stator windings 6 generate waste heat which has to be dissipated from the machine 1 in order to prevent overheating and associated damage or even destruction of the machine 1. The stator windings 6 are therefore cooled with the aid of a coolant K which is guided through the stator 2 and which, by transmission of heat, absorbs waste heat generated by the stator windings 6.

In order to guide the coolant K through the stator 2, the machine 1 comprises a coolant distributor chamber 4 into which a coolant K can be introduced via a coolant inlet 33. A coolant collector chamber 5 is arranged along the axial direction A at a distance from the coolant distributor chamber 4. The coolant distributor chamber 4 communicates fluidically with the coolant collector chamber 5 by means of a plurality of cooling channels 10, of which only a single one can be seen in the illustration of FIG. 1. The coolant distributor chamber 4 and the coolant collector chamber 5 can each have an annular geometry in a cross section, not shown in the figures, perpendicular to the axial direction A. A plurality of cooling channels 10 are arranged spaced apart from one another along the circumferential direction U and each extend along the axial direction A from the annular coolant distributor chamber 4 to the annular coolant collector chamber 5. The coolant K introduced into the coolant distributor chamber 4 via the coolant inlet 33 can therefore be distributed to the individual cooling channels 10. After flowing through the cooling channels 10 and absorbing heat from the stator windings, the coolant K is collected in the coolant collector chamber 5 and is discharged again from the machine 1 via a coolant outlet 34 provided on the stator 2.

As can be seen in the illustrations of FIGS. 1 and 2, the stator windings 6 are arranged in intermediate spaces 9 which are formed between in each case two adjacent stator teeth 8 in the circumferential direction U. Said intermediate spaces 9 are also known to a relevant person skilled in the art as "stator grooves" or "stator slots" which, like the stator teeth 8, extend along the axial direction A.

Figure 3:
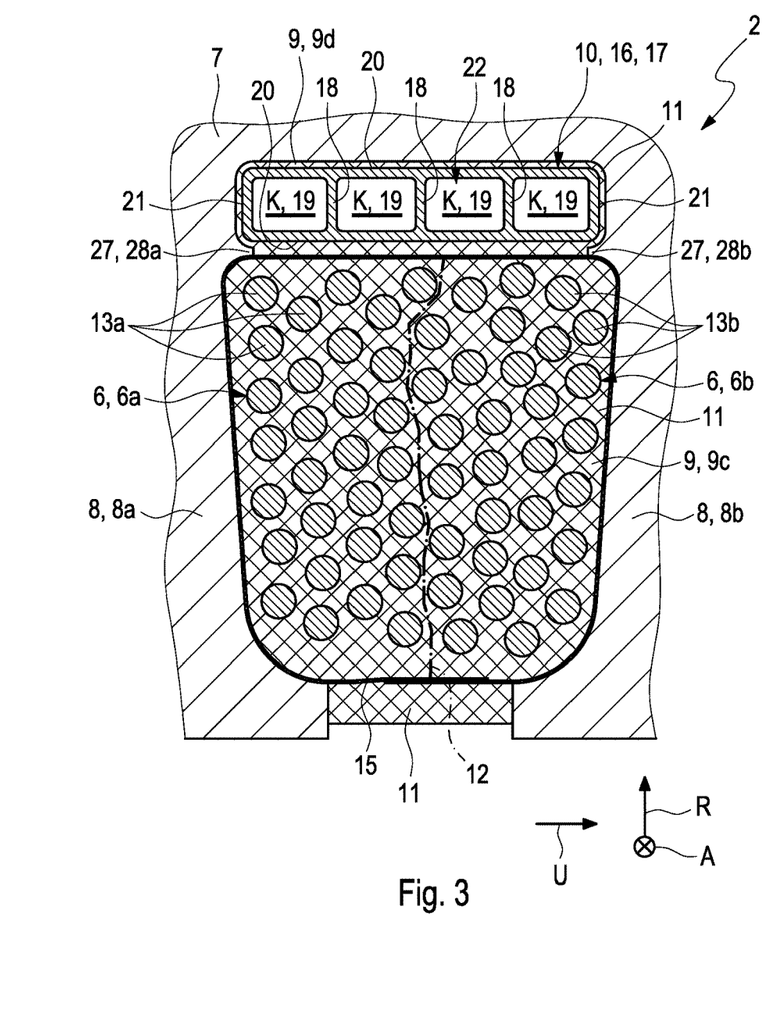
FIG. 3 shows a detailed illustration of the stator of FIG. 2 in the region of an intermediate space between two adjacent stator teeth in the circumferential direction.

Attention will now be turned to the illustration of FIG. 3 which shows an intermediate space 9 formed between two adjacent stator teeth 8 in the circumferential direction U—also referred to below as stator teeth 8a, 8b, in a detailed illustration. In order to improve the transmission of heat of the waste heat generated by the stator winding 6 to the coolant K flowing through the cooling channels 10, a plastics compound 11 composed of a plastic is provided in each of the intermediate spaces 9 according to FIG. 3. The plastics compound 11 is particularly preferably an injection molding compound consisting of an electrically insulating plastic. The use of an injection molding process simplifies and accelerates the production of the plastics compound. In the example of FIG. 3, the plastics compound 11 is composed of a single plastics material. The cooling channel 10 arranged in the intermediate space 9 and the stator winding 6 arranged in the same intermediate space 9 are embedded in the plastics compound 11, which can be composed, for example, of a thermosetting plastic or thermoplastic. It goes without saying that the stator winding 6 arranged in the intermediate space 9 according to FIG. 3 in each case partially belongs to a first stator winding 6a which is carried by a first stator tooth 8a and is partially assigned to a second stator winding 6b which is carried by a second stator tooth 8b adjacent to the first stator tooth 8a in the circumferential direction U. A virtual separating line 12 is shown in FIG. 3 to clarify this scenario. The winding wires 13a shown on the left of the separating line 12 in FIG. 3 belong to the stator winding 6a carried by the stator tooth 8a. The winding wires 13b shown on the right of the separating line 12 belong to the stator winding 6b carried by the stator tooth 8b.

As the detailed illustration of FIG. 3 furthermore shows, additional electrical insulation 15 consisting of an electrically insulating material is arranged in the respective intermediate space 9 between the plastics compound 11 and the stator body 7 or the two stator teeth 8a, 8b bounding the intermediate space 9 in the circumferential direction U. Electrical insulation 15 consisting of paper has proven particularly cost-effective. In the event of the plastics compound 11 cracking because of thermal overloading or being damaged in another manner, an undesirable electrical short circuit of the stator winding 6 with the material of the stator body 7 or of the stator teeth 8 or 8a, 8b—typically iron or another suitable electrically conductive material—can thereby be avoided.

As the detailed illustration of FIG. 3 verifies, the cooling channels 10 can each be formed by a tubular body 13, for example consisting of aluminum, which surrounds a tubular body interior space 22. As shown in the detailed illustration of FIG. 3, one or more separating elements 18 which divide the cooling channel 10 into partial cooling channels 19 which are fluidically separated from one another can optionally be formed on the tubular body 16. The flow behavior of the coolant K in the cooling channel 10 can thereby be improved, which is associated with an improved transfer of heat to the coolant K. In addition, the tubular body 16 is thereby additionally stiffened mechanically. FIG. 3 illustrates by way of example three such separating elements 18, thus resulting in four partial cooling channels 19. Self-evidently, a different number of separating elements 18 is possible in variants of the example. The tubular body 16 forming the cooling channel 10 is designed as a flat tube 17 which, in a cross section perpendicular to the axis of rotation D of the rotor 3 (cf. FIG. 3), has two wide sides 20 and two narrow sides 21. In the cross section, shown in FIG. 3, perpendicular to the axial direction A, the two wide sides 20 of the flat tube 17 extend perpendicular to the radial direction R. A length of the two wide sides 20 is at least four times, preferably at least ten times, a length of the two narrow sides 21.

In the example of FIGS. 1 to 3, the cooling channels 10 are arranged radially outside the stator windings 6 in the respective intermediate space 9. The radial distance of the cooling channels 10 from the axis of rotation D of the rotor 3 is therefore greater than that of the stator windings 6 from the axis of rotation D. However, an arrangement of the cooling channels 10 radially on the inside is also conceivable.

In order to produce an electrical machine 1 according to FIGS. 1 to 3, first of all the cooling channels 10 formed by tubular bodies 16 or flat tubes 17 are introduced into the intermediate spaces 9. The electrical insulation 15, for example consisting of paper, is then inserted into the intermediate spaces 9. After that, the stator windings 6 are arranged on the stator teeth 8 and are therefore also introduced into the intermediate spaces 9 and subsequently insert molded with the plastic producing the plastics compound 11, for example a thermosetting plastic. During the production of the plastics compound 11, the stator body 7 can also be insert molded with the plastic producing the plastics compound 11, i.e. in particular with the thermosetting plastic.

Figure 4:
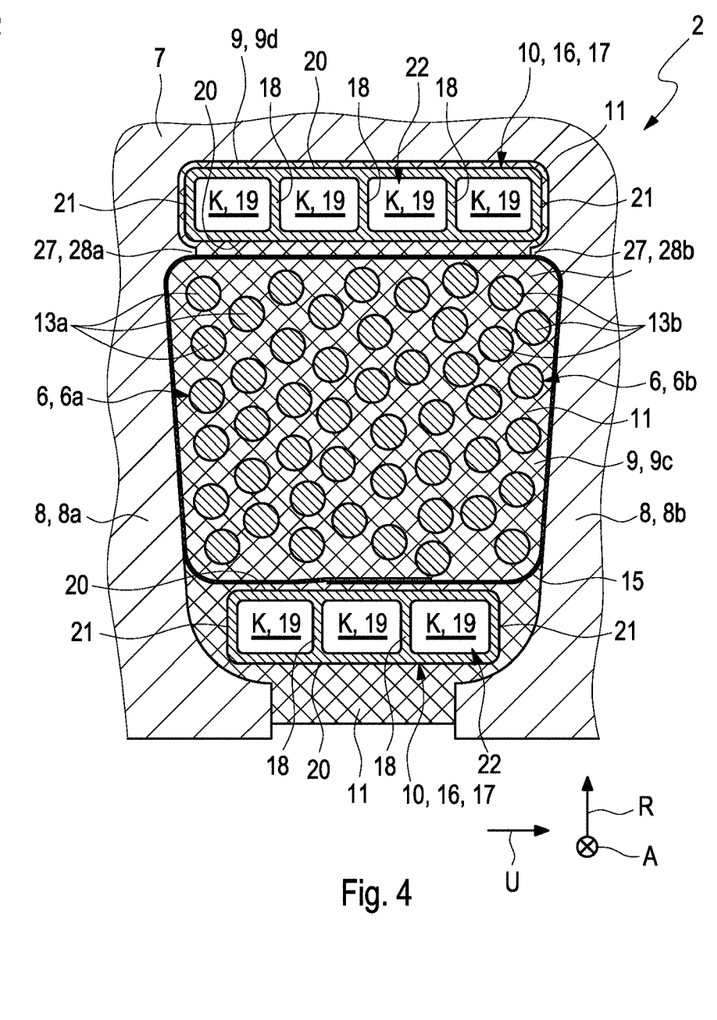
FIG. 4 shows a development of the variant according to FIG. 3.

According to FIG. 3, the intermediate space 9 comprises a first partial space 9c in which the stator winding 6 is arranged and a second partial space 9d in which the cooling channel 10 is arranged and which complements the first partial space 9c to form the intermediate space 9. As FIGS. 3 and 4 show, a fixing device 27 by means of which the cooling channel 10 is fixed in the second partial space 9d can be arranged between the two partial spaces. Said fixing device 27 comprises two projections 28a, 28b which are formed on the two stator teeth 8a, 8b which are adjacent in the circumferential direction U and the intermediate space 9. The two projections 28a, 28b face each other in the circumferential direction U and project into the intermediate space in order to fix the cooling channel. The projections 28a, 28b act as a radial stop for the cooling channel 10, which is in the form of a tubular body 16 or flat tube 17, the stop preventing an undesirable movement of the cooling channel 10 radially inward, in particular during the production of the plastics compound 11 by means of injection molding.

FIG. 4 shows a development of the example of FIG. 3. The development of FIG. 4 differs from the example of FIG. 3 in that a cooling channel 10 which, as in the example of FIG. 3, can be in the form of a tubular body 16 or a flat tube 17, is provided in the intermediate space 9 not only radially on the outside but additionally also radially on the inside. By way of example, the radially inner cooling channel 10 is illustrated as a flat tube 17 with two separating elements 18 and three partial cooling channels 19. The above explanations with regard to the example of FIG. 3 apply, if expedient, mutatis mutandis also to the example of FIG. 4.

Reference is again made to FIG. 1 below. As FIG. 1 verifies by way of illustration, the integrally formed plastics compound 11 can project axially on both sides from the intermediate spaces 9. This makes it possible also to embed the coolant distributor chamber 4 and, alternatively or additionally, the coolant collector chamber 5 into the plastics compound 11 for the thermal coupling to the two axial end portions 14a, 14b of the respective stator windings 6 that are arranged axially outside the respective intermediate space 9. This makes it possible for effective transfer of heat to the coolant K present in the coolant distributor chamber 4 or coolant collector chamber 5 to be produced even in the region of the conventionally thermally particularly loaded axial end portions 14a, 14b of the relevant stator winding 6. This measure permits particularly effective cooling of the two axial end portions 14a, 14b of the stator windings 6.

Furthermore, according to FIG. 1, the stator 2 with the stator body 7 and the stator teeth 8 is arranged axially between a first and a second end plate 25a, 25b.

As FIG. 1 shows, part of the coolant distributor chamber 4 is arranged in the first end plate 25a and part of the coolant collector chamber 5 is arranged in the second end plate 25b. The coolant distributor chamber 4 and the coolant collector chamber 5 are therefore each partially formed by a cavity 41a, 41b provided in the plastics compound 11.

The first cavity 41a is complemented here by a cavity 42a, formed in the first bearing plate 25a, to form the coolant distributor chamber 4. In a corresponding manner, the second cavity 41b is complemented by a cavity 42b, formed in the second end plate 25b, to form the coolant collector chamber 5. In the variant embodiment explained above, the plastics compound 11 therefore at least partially bounds the coolant distributor chamber 4 and the coolant collector chamber 5.

The first bearing plate 25a can furthermore contain a coolant feed 35 which fluidically connects the coolant distributor chamber 4 to a coolant inlet 33 provided on the outside, in particular, as illustrated in FIG. 1, on the circumferential side, of the first end plate 25a. A second end plate 25b can correspondingly contain a coolant drain 36 which fluidically connects the coolant collector chamber 5 to a coolant outlet 34 provided on the outside, in particular, as illustrated in FIG. 1, on the circumferential side, of the end plate 25b. This permits an arrangement of the coolant distributor chamber 4 and of the coolant collector chamber 5 in each case radially on the outside of the first and the second end portion 14a, 14b, respectively, of the relevant stator winding 6 and also along the axial direction A as an extension of said end portions 14a, 14b. The end portions 14a, 14b of the stator windings 6 that are particularly loaded thermally during the operation of the machine 1 are also particularly effectively cooled by means of this measure.

According to FIG. 1, the plastics compound 11 consisting of the electrically insulating plastic can also be arranged on an outer circumferential side 30 of the stator body 7 and can therefore form a plastics coating 11.1 on the outer circumferential side 30. The stator body 7 of the stator 2 that is typically formed from electrically conductive stator plates can therefore be electrically insulated from the surroundings. The provision of a separate housing for receiving the stator body 7 can therefore be omitted.

Figure 5:
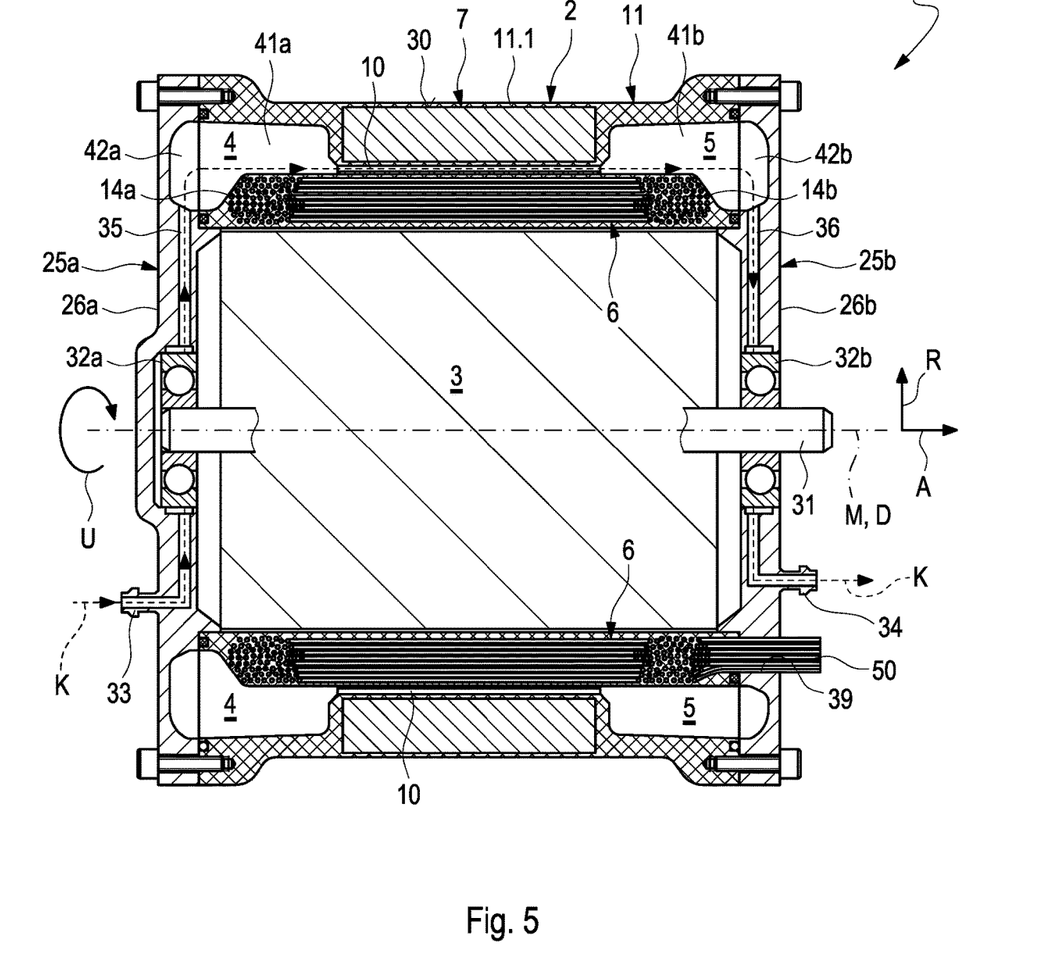
FIG. 5 shows a first variant of the electrical machine of FIG. 1, in which the coolant flowing through the cooling channels is also used for cooling the shaft bearings of the rotor.

FIG. 5 shows a variant of the example of FIG. 1. In order also to cool the rotor shaft 31 and the two shaft bearings 32a, 32b during the operation of the machine 1, the coolant feed 35 can be thermally coupled to the first shaft bearing 32a arranged in the first end plate 25a. Similarly, the coolant drain 36 can be thermally coupled to the second shaft bearing 32b arranged in the second end plate 25b. A separate cooling device for cooling the shaft bearings 32a, 32b can thereby be permitted, which results in not inconsiderable cost advantages. In the example of FIG. 5, the coolant inlet 33 and the coolant outlet 34 are provided on the outer end side 26a, 26b of the respective end plate 25a, 25b. However, a circumferential or radial arrangement is also conceivable. In the variant according to FIGS. 5 and 1, the stator windings 6 are arranged radially with respect to the radial direction R within the cooling channels 10.

The stator windings 6 are guided outward from the stator 2 with an electrical connection 50 through a leadthrough 39 provided in the second end plate 25b, and therefore said stator windings can be electrically energized from the outside.

The leadthrough 39 is arranged radially between the coolant distributor chamber 4 or the coolant collector chamber 5 and the axis of rotation D.

Figure 6:
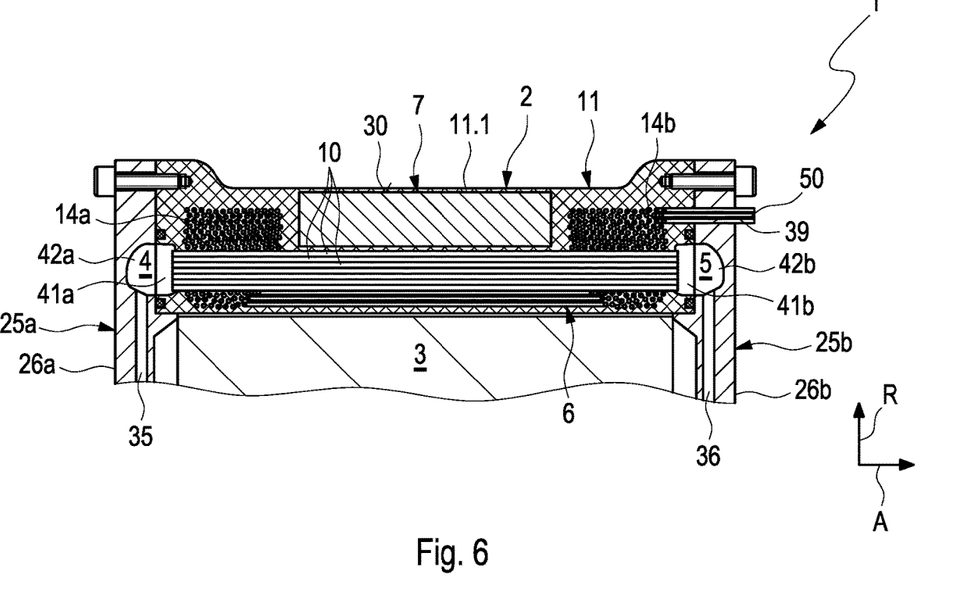
FIG. 6 shows a second variant of the electrical machine according to FIG. 1 which takes up particularly little construction space.

In the example of FIG. 6 which shows an embodiment which is simplified in relation to FIG. 5, the coolant distributor chamber 4 and the coolant collector chamber 5 are arranged exclusively in the axial extension of the cooling channels 10. This variant requires particularly little construction space for the coolant distributor chamber 4 and for the coolant collector chamber 5.

In the variant according to FIG. 6, the stator windings 6 are arranged radially with respect to the radial direction R within the cooling channels 10. The stator windings 6 are guided outward from the stator 2 with an electrical connection 50 through a leadthrough 39 provided in the second end plate 25b, such that said stator windings can be electrically energized from the outside. The leadthrough 39 is arranged in the second end plate 25b radially with respect to the radial direction outside the coolant distributor chamber 4 or the coolant collector chamber 5.

Figure 7:
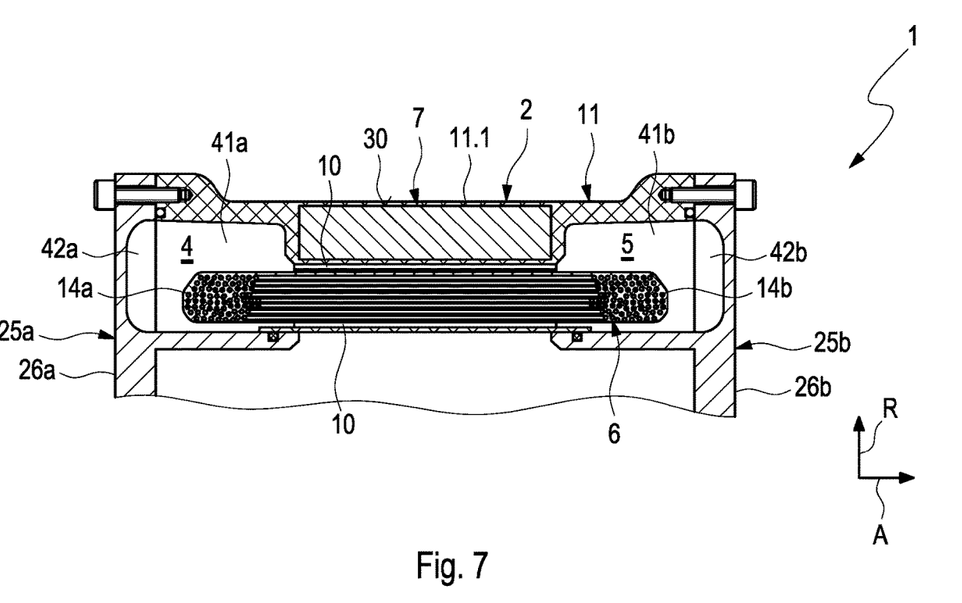
FIG. 7 shows a third variant of the machine according to FIG. 1 which permits particularly effective cooling of the stator windings.

A development of FIG. 5 is shown in the example of FIG. 7. In this development, the coolant distributor chamber 4 surrounds the first axial end portion 14a of the respective stator winding 6 in a U-shaped manner, i.e. axially on the end side and also radially on the inside and radially on the outside, in the longitudinal section, illustrated in FIG. 7, along the axis of rotation D. In a corresponding manner, the coolant collector chamber 5 surrounds the second axial end portion 14b of the respective stator winding 6 in a U-shaped manner, i.e. axially on the end side and radially on the inside and radially on the outside, in the longitudinal section along the axis of rotation D. In this variant, cooling channels 10 are provided both radially within and also radially outside the stator winding 6. The respective stator windings 6 including their axial end portions 14a, 14b are therefore in direct thermal contact with the coolant K via the cooling channels 10 and the coolant distributor chamber 4 and the coolant collector chamber 5. This permits particularly effective cooling of the stator winding 6, including the axial end portions 14a, 14b which are exposed to particular loads thermally.

The plastics compound 11 can also surround the winding portion of the stator winding 6 that projects axially out of the intermediate space 9 of the stator body, and can partially bound the coolant distributor chamber 4 or the coolant collector chamber 5 in the process such that the relevant stator windings 6 or the relevant winding portion of the stator winding 6 is insulated electrically in relation to the coolant when the latter is guided through the relevant cooling channel 10 during the operation of the machine 1.

The coolant distributor chamber 4 and the coolant collector chamber 5 are expediently arranged adjacent to the stator body 7 in an axial extension thereof. The coolant distributor chamber 4 or the coolant collector chamber 5 preferably does not project beyond the stator body 7 or stator 2 along the radial direction R thereof.

The stator winding 6 is in each case designed in such a manner that it is electrically insulated from the coolant K and from the stator body 7 of the stator 2 at least in the region within the respective intermediate space 9 during the operation of the electrical machine 1. An undesirable electrical short circuit of the stator winding 6 with the stator body 7—during the operation of the electrical machine 1—with the coolant K is thereby prevented. Such electrical insulation of the stator winding 6 in relation to the stator body 7—preferably also in relation to the stator teeth 8 bounding the intermediate space 9—is expediently completely formed by the plastic compound 11 and/or by the additional electrical insulation 15 already mentioned above.

The additional electrical insulation 15 expediently extends within the intermediate space 9 over the entire length of the intermediate space 9, as measured along the axial direction A, such that the electrical insulation insulates the stator winding 6 from the stator body 7 and/or from the stator teeth 8. The additional electrical insulation 15 likewise expediently surrounds the stator winding 6 within the intermediate space 9 over at least the entire length of the intermediate space 9 along the circumferential boundary thereof. The stator winding 6 is expediently also electrically insulated from the cooling channel, which is in the form of a tubular body 16. The electrical insulation is formed here by the plastics compound and, alternatively or additionally, by the additional electrical insulation 15.

The invention claimed is:

1. An electrical machine, comprising:
a rotor configured to be rotatable about an axis of rotation that defines an axial direction of the electrical machine,
a stator including stator windings,
wherein, for thermal coupling, at least one cooling channel and at least one of the stator windings are embedded into a plastics compound including an electrically insulating plastic
wherein the stator has stator teeth that extend along the axial direction, are arranged spaced apart from one another along a circumferential direction of the rotor, and support the stator windings,
a coolant distributor chamber and a coolant collector chamber arranged at an axial distance to said coolant distributor chamber, wherein the coolant distributor chamber for cooling the stator windings communicates fluidically with the coolant collector chamber by the at least one cooling channel through which a coolant can flow, and
wherein the plastics compound comprising the at least one cooling channel and the at least one stator winding arranged in an intermediate space, which is embodied between the stator teeth that are adjacent in the circumferential direction,
wherein at least one of the stator winding includes at least one axial end portion that protrudes axially from the intermediate space and into at least one of the coolant distributor chamber and the coolant collector chamber, and the plastics compound projects axially from the intermediate space and at least partially surrounds and embeds the at least one axial end portion to at least partially limit the at least one of the coolant distributor chamber and the coolant collector chamber, so that the at least one axial end portion of the at least one stator winding is electrically insulated with respect to the coolant during operation of the electrical machine.

2. The electrical machine of claim 1, wherein, for the thermal coupling to the stator windings, at least one of the coolant distributor chamber and the coolant collector chamber is at least partially arranged in the one plastics compound.

3. The electrical machine of claim 1, wherein the intermediate space comprises a first partial space in which the at least one stator winding is arranged, and a second partial space in which the at least one cooling channel is arranged, and a positioning aid is arranged between the two partial spaces such that the at least one cooling channel can be positioned in the second partial space.

4. The electrical machine of claim 3, wherein the positioning aid comprises two projections that are formed on two adjacent stator teeth in the circumferential direction, and the two projections face each other in the circumferential direction and project into the intermediate space beyond circumferential ends of the at least one cooling channel to position the cooling channel and provide a radial stop for the at least one cooling channel.

5. The electrical machine of claim 1, wherein the at least one of the coolant distributor chamber and the coolant collector chamber surrounds the at least one axial end portion of the at least one stator winding in a U-shaped manner.

6. The electrical machine of claim 1, wherein the plastics compound at least partially bounds at least one of the coolant distributor chamber and the coolant collector chamber.

7. The electrical machine of claim 1, wherein in the intermediate space the plastics compound includes a single plastic, and an additional electrical insulation including an electrically insulating material is arranged in the intermediate space.

8. The electrical machine of claim 7, wherein the additional electrical insulation is arranged between at least one of the stator windings and the stator teeth.

9. The electrical machine of claim 1, wherein the electrically insulating plastic includes at least one of a thermosetting plastic and a thermoplastic.

10. The electrical machine of claim 1, wherein at least one cooling channel and the plastics compound are provided in the intermediate space between two of the stator teeth that are respectively adjacent in the circumferential direction.

11. The electrical machine of claim 1, wherein the at least one cooling channel is arranged at least one of radially outside and radially within a respective one of the stator windings in the intermediate space.

12. The electrical machine of claim 1, wherein the at least one cooling channel includes a tubular body that surrounds a tubular body interior space, and wherein at least one separating element divides the tubular body interior space into at least two partial cooling channels that are fluidically separated from one another is formed on the tubular body.

13. The electrical machine of claim 12, wherein the tubular body includes a flat tube, and wherein, in a cross section perpendicular to the axial direction, at least one wide side of the flat tube extends substantially perpendicularly to the radial direction.

14. The electrical machine of claim 1, wherein the plastics compound is an injection molding compound consisting of the electrically insulating plastic.

15. The electrical machine claim 1, wherein the stator comprises a stator body, and wherein the plastics compound consisting of the electrically insulating plastic is arranged on an outer circumferential side of the stator body and forms an outer coating on said outer circumferential side.

16. The electrical machine of claim 1, wherein the coolant distributor chamber communicates fluidically with the coolant collector chamber by a plurality of cooling channels.

17. The electrical machine of claim 16, wherein the plurality of cooling channels extends spaced apart from one another along the axial direction.

18. The electrical machine of claim 16, wherein the plurality of cooling channels are arranged at a distance from one another along a circumferential direction of the stator.

19. The electrical machine of claim 1, wherein at least one of the coolant distributor chamber and the coolant collector chamber is arranged adjacent to the stator body or stator exclusively in an axial extension thereof and does not project beyond said stator body or stator along a radial direction thereof.

20. The electrical machine of claim 1, wherein at least one stator winding is designed in such a manner that it is insulated electrically from the coolant and from the stator body at least in the region within the respective intermediate space during operation of the electrical machine.

21. The electrical machine of claim 20, wherein said electrical insulation of the at least one of the stator windings from the stator body, also from the stator teeth bounding the intermediate space, is formed by at least one of the plastics compound and an additional electrical insulation.

22. The electrical machine of claim 7, the additional electrical insulation within the intermediate space extends over the entire length of the intermediate space, as measured along the axial direction, such that said insulation insulates at least one of the stator windings from the stator body and from stator teeth of the stator bounding the respective intermediate space.

23. The electrical machine of claim 7, wherein the additional electrical insulation surrounds at least one of the stator windings within the intermediate space at least over an entire length of the intermediate space along the circumference thereof.

24. The electrical machine of claim 22, wherein the at least one stator winding is insulated electrically from the cooling channel, which is in the form of a tubular body, by at least one of the plastics compound and the additional insulation.

25. The electrical machine as claimed in claim 1, the stator windings are part of a distributed winding.

26. A vehicle comprising:

at least one electrical machine including:

a rotor configured to be rotatable about an axis of rotation that defines an axial direction, a stator including stator windings and stator teeth that extend along the axial direction, the stator teeth being arranged spaced apart from one another along a circumferential direction of the rotor and support the stator windings, a coolant distributor chamber, a coolant collector chamber arranged axially at a distance from the coolant distributor chamber, wherein the coolant distributor chamber is configured to cool the stator windings by communicating fluidically with the coolant collector chamber via at least one cooling channel through which a coolant is flowable, and wherein the at least one cooling channel and at least one of the stator windings are embedded into a plastics compound for thermal coupling, the plastics compound including an electrically insulating plastic, wherein the plastics compound with the at least one cooling channel and the at least one stator winding are arranged in an intermediate space disposed between the stator teeth that are adjacent in the circumferential direction, and wherein the at least one stator winding includes axial end portions that protrude axially from the intermediate space and respectively into the coolant distributor chamber and the coolant collector chamber, and the plastics compound projects axially from the intermediate space and at least partially surrounds and embeds the axial end portions to at least partially limit the coolant distributor chamber and the coolant collector chamber, so that the axial end portions of the at least one stator winding are electrically insulated with respect to the coolant during operation of the at least one electrical machine.

\* \* \* \* \*